US011811313B2

United States Patent
Huang et al.

(10) Patent No.: US 11,811,313 B2
(45) Date of Patent: Nov. 7, 2023

(54) SWITCHED CAPACITOR CONVERTER AND SWITCH CIRCUIT AND SWITCH THEREOF

(71) Applicant: Richtek Technology Corporation, Zhubei (TW)

(72) Inventors: Tsung-Wei Huang, Taipei (TW); Shui-Mu Lin, Taichung (TW); Fan Ho, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/892,068

(22) Filed: Aug. 20, 2022

(65) Prior Publication Data

US 2023/0092623 A1    Mar. 23, 2023

Related U.S. Application Data

(60) Provisional application No. 63/247,754, filed on Sep. 23, 2021.

(30) Foreign Application Priority Data

Jun. 7, 2022   (TW) .................................. 111121080

(51) Int. Cl.
*H02M 3/07*     (2006.01)
*H02M 3/158*    (2006.01)

(52) U.S. Cl.
CPC ............. *H02M 3/07* (2013.01); *H02M 3/158* (2013.01)

(58) Field of Classification Search
None
See application file for complete search history.

(56) References Cited

U.S. PATENT DOCUMENTS

| | | | |
|---|---|---|---|
| 6,353,309 B1 * | 3/2002 | Ootani ................. | H03K 17/122 323/282 |
| 6,930,473 B2 * | 8/2005 | Elbanhawy ......... | H02M 3/1584 323/282 |
| 10,305,473 B2 * | 5/2019 | Pidutti ............... | H03K 17/6872 |

* cited by examiner

*Primary Examiner* — Jeffery S Zweizig
(74) *Attorney, Agent, or Firm* — Tung & Associates

(57) ABSTRACT

A switched capacitor converter includes plural switch units. The switch units are configured to switch a coupling relationship of a capacitor between a first power and a second power, wherein at least one of the switch units includes a switch circuit. The switch circuit includes a first switch, a second switch, and a switch driving circuit, wherein the conduction resistance of the first switch is greater than the conduction resistance of the second switch, and the parasitic capacitance of the first switch is less than the parasitic capacitance of the second switch. The switch driving circuit turns on the first switch before the second switch is turned on and/or turns off the first switch after the second switch is turned off, such that the switching loss of the switch circuit is less than a predetermined target value.

29 Claims, 13 Drawing Sheets

SWITCHED CAPACITOR CONVERTER AND SWITCH CIRCUIT AND SWITCH THEREOF

CROSS REFERENCE

The present invention claims priority to U.S. 63/247,754 filed on Sep. 23, 2021 and claims priority to TW 111121080 filed on Jun. 7, 2022.

BACKGROUND OF THE INVENTION

Field of Invention

The present invention relates to a switched capacitor converter, in particular to a switched capacitor converter with low switching loss and low conduction loss. The present invention also relates to a switch circuit with low switching loss and low conduction loss, which is suitable for use in a switched capacitor converter.

Description of Related Art

Please refer to FIG. 1, which is a schematic diagram of a switched capacitor converter 100 of the conventional art. As shown in FIG. 1, the switched capacitor converter 100 is a circuit based on charge pump technology (charge pump technology is well known to those skilled in this art, so the details thereof are not redundantly explained herein). The switched capacitor converter 100 is configured to convert the power of a power supply POW into a charging power to charge the battery; the switched capacitor converter 100 is often used in various types of chargers, such as mobile phone chargers, notebook computer chargers, etc. Because there are plural switches Q1-Q4 included in the conventional switched capacitor converter 100, the parasitic capacitances of the switches Q1-Q4 cause problems of larger switching loss and higher temperature during fast charging.

In addition, since most of the switched capacitor converters 100 of the conventional art use metal-oxide-semiconductor field-effect transistors (MOSFETs) as their internal switches, the charging efficiency of the switched capacitor converters 100 of the conventional art is also adversely impacted by the manufacturing process of the MOSFETs. Please refer to FIG. 2 and FIG. 3 at same time. FIG. 2 is a schematic layout diagram of the MOSFETs of the conventional art, and FIG. 3 is a characteristic diagram of a safe operating area (SOA) of the MOSFETs of the conventional art. As shown in FIG. 2 and FIG. 3, the MOSFET of the conventional art has a ring body contact B, so that the MOSFET of the conventional art has a larger SOA to prevent damage (as indicated by the solid line L1). However, due to the larger area of the body contact B, the MOSFET of the conventional art has a larger conduction resistance, and thus the switched capacitor converter 100 of the conventional art has a larger conduction loss.

In view of the above shortcomings of the conventional art, the present invention proposes a switched capacitor converter 300 and a switch circuit 200 thereof, in which not only an overall loss of the switched capacitor converter 300 can be reduced to improve its charging efficiency under different loading conditions, but also the temperature of the switched capacitor converter 300 during fast charging can be reduced.

SUMMARY OF THE INVENTION

From one perspective, the present invention provides a switch circuit, comprising: a first switch, including a first control end, a first inverting output end, and a first non-inverting output end; a second switch, including a second control end, a second inverting output end, and a second non-inverting output end, wherein the second non-inverting output end is coupled to the first inverting output end, and the second non-inverting output end is coupled to the first non-inverting output end, and wherein a conduction resistance of the first switch is greater than a conduction resistance of the second switch, and a parasitic capacitance of the first control end is less than a parasitic capacitance of the second control end; and a switch driving circuit, configured to generate a first control signal and a second control signal to control the first switch and the second switch, respectively; wherein the switch driving circuit controls the first switch to be turned on before the second switch is turned on and/or controls the first switch to be turned off later than a time point at which the second switch is turned off, so that when the second switch is turned on and/or turned off, a voltage difference between the second inverting output end and the second non-inverting output end is less than a predetermined voltage difference target value, so that a switching loss of the switch circuit is less than a predetermined target value.

In one embodiment, a layout area of the first switch is less than a layout area of the second switch.

In one embodiment, a ratio of the layout area of the first switch to the layout area of the second switch ranges from 1/5 to 1/3.

In one embodiment, the second switch is a metal-oxide-semiconductor field-effect transistor (MOSFET); the second control end is a gate; the second inverting output end is a drain; and the second non-inverting output end is a source.

In one embodiment, an open-circuit withstand voltage of the second switch is less than an open-circuit withstand voltage of the first switch.

In one embodiment, a coverage scope of a safe operating area (SOA) of the second switch is less than a coverage scope of the SOA of the first switch.

In one embodiment, a sheet resistance of the second switch is less than a sheet resistance of the first switch.

In one embodiment, an area ratio of the body contact of the second switch is less than an area ratio of the body contact of the first switch, so that the sheet resistance of the second switch is less than the sheet resistance of the first switch.

In one embodiment, the SOA of the first switch is non-rectangle.

In one embodiment, the SOA of the second switch is non-rectangle.

In one embodiment, the SOA of the second switch includes an inflection point, and a turning point withstand voltage corresponding to the inflection point is less than the open-circuit withstand voltage of the second switch.

In one embodiment, the turning point withstand voltage corresponding to the inflection point is 1/10 to 1/5 times the open-circuit withstand voltage of the second switch.

In one embodiment, a voltage of the second control end corresponding to the inflection point is greater than a turn-on threshold voltage of the second switch.

In one embodiment, the switching drive circuit further includes a clamper coupled between the first inverting output end and the first control end, wherein the clamper is configured to clamp a voltage difference between the first inverting output end and the first control end to be below a clamping limit, so that a voltage difference between the first inverting output end and the first non-inverting output end does not exceed an absolute maximum rating of the first switch, and the clamping limit is less than the absolute maximum rating of the first switch.

In one embodiment, the switching drive circuit further includes a current source coupled between the first control end and the first non-inverting output end and configured to bias the clamper.

In one embodiment, the switching drive circuit further includes a clamper coupled between the second inverting output end and the second control end, wherein the clamper is configured to clamp a voltage difference between the second inverting output end and the second control end to be below a clamping limit, so that a voltage difference between the second inverting output end and the second non-inverting output end does not exceed an absolute maximum rating of the second switch, and the clamping limit is less than the absolute maximum rating of the second switch.

In one embodiment, the switching drive circuit further includes a current source coupled between the second control end and the second non-inverting output end and configured to bias the clamper.

In one embodiment, the switch circuit is used in a switched capacitor converter, and is configured to operably switch a coupling relationship of a capacitor with a first power and a second power, thereby converting the first power into the second power, or converting the second power into the first power, wherein a voltage of the first power is greater than a voltage of the second power.

In one embodiment, the switched capacitor converter includes a first switch unit, a second switch unit, a third switch unit, and a fourth switch unit, wherein at least one of the first switch unit, the second switch unit, the third switch unit, and the fourth switch unit includes the switch circuit. The first switch unit is coupled between a first power and a first end of a capacitor; the second switch unit is coupled between the first end of the capacitor and a second power; the third switch unit is coupled between the second power and the second end of the capacitor; the fourth switch unit is coupled between the second end of the capacitor and a ground potential. The first switch unit, the second switch unit, the third switch unit, and the fourth switch unit are configured to periodically switch the first end of the capacitor between the first power and the second power, and the second end of the capacitor is correspondingly switched between the second power and the ground potential, so that the first power is converted into the second power, or the second power is converted into the first power, wherein the voltage of the first power is twice the voltage of the second power, and a current of the first power is 1/2 times a current of the second power.

From another perspective, the present invention provides a switched capacitor converter, comprising: a plurality of switch units, configured to switch a coupling relationship of a capacitor with a first power and a second power, thereby converting the first power into the second power, or converting the second power into the first power, wherein a voltage of the first power is greater than a voltage of the second power; wherein at least one of the switch units includes a switch circuit, the switch circuit including: a first switch, including a first control end, a first inverting output end, and a first non-inverting output end; a second switch, including a second control end, a second inverting output end, and a second non-inverting output end, wherein the second inverting output end is coupled to the first inverting output end, and the second non-inverting output end is coupled to the first non-inverting output end, and wherein a conduction resistance of the first switch is greater than a conduction resistance of the second switch, and a parasitic capacitance of the first control end is less than a parasitic capacitance of the second control end; and a switch driving circuit, configured to generate a first control signal and a second control signal to control the first switch and the second switch, respectively; wherein the switch driving circuit controls the first switch to be turned on before the second switch is turned on and/or controls the first switch to be turned off later than a time point at which the second switch is turned off, so that when the second switch is turned on and/or turned off, a voltage difference between the second inverting output end and the second non-inverting output end is less than a predetermined voltage difference target value, so that a switching loss of the switch circuit is less than a predetermined target value.

In one embodiment, the switch units includes a first switch unit, a second switch unit, a third switch unit, and a fourth switch unit, wherein at least one of the first switch unit, the second switch unit, the third switch unit, and the fourth switch unit includes the switch circuit. The first switch unit is coupled between a first power and a first end of a capacitor; the second switch unit is coupled between the first end of the capacitor and a second power; the third switch unit is coupled between the second power and the second end of the capacitor; the fourth switch unit is coupled between the second end of the capacitor and a ground potential. The first switch unit, the second switch unit, the third switch unit, and the fourth switch unit are configured to periodically switch the first end of the capacitor between the first power and the second power, and the second end of the capacitor is correspondingly switched between the second power and the ground potential, so that the first power is converted into the second power, or the second power is converted into the first power, wherein the voltage of the first power is twice the voltage of the second power, and a current of the first power is ½ times a current of the second power.

In one embodiment, an open-circuit withstand voltage of the second switch is less than an open-circuit withstand voltage of the first switch.

In one embodiment, a SOA of the second switch is less than a SOA of the first switch.

In one embodiment, a sheet resistance of the second switch is less than a sheet resistance of the first switch.

In one embodiment, an area ratio of the body contact of the second switch is less than an area ratio of the body contact of the first switch, so that the sheet resistance of the second switch is less than the sheet resistance of the first switch.

In one embodiment, the SOA of the first switch is non-rectangle.

In one embodiment, the SOA of the second switch is non-rectangle.

In one embodiment, the SOA of the second switch includes an inflection point, and a turning point withstand voltage corresponding to the inflection point is less than the open-circuit withstand voltage of the second switch.

In one embodiment, the turning point withstand voltage corresponding to the inflection point is 1/10 to 1/5 times the open-circuit withstand voltage of the second switch.

In one embodiment, a voltage of the second control end corresponding to the inflection point is greater than a turn-on threshold voltage of the second switch.

In one embodiment, a voltage of the second control end corresponding to the inflection point is less than a turn-on threshold voltage of the second switch.

In one embodiment, the switch circuit further includes a clamper coupled between the first inverting output end and the first control end, wherein the clamper is configured to clamp a voltage difference between the first inverting output end and the first control end to be below a clamping limit, so that a voltage difference between the first inverting output end and the first non-inverting output end does not exceed an absolute maximum rating of the first switch, and the clamping limit is less than the absolute maximum rating of the first switch.

In one embodiment, the switch circuit further includes a current source coupled between the first control end and the first non-inverting output end and configured to bias the clamper.

In one embodiment, the switch circuit further includes a clamper coupled between the second inverting output end and the second control end, wherein the clamper is configured to clamp a voltage difference between the second inverting output end and the second control end to be below a clamping limit, so that a voltage difference between the second inverting output end and the second non-inverting output end does not exceed an absolute maximum rating of the second switch, and the clamping limit is less than the absolute maximum rating of the second switch.

In one embodiment, the switch circuit further includes a current source coupled between the second control end and the second non-inverting output end and configured to bias the clamper.

From another perspective, the present invention provides a switch, configured to switch a coupling relationship of a capacitor with a first power and a second power, thereby converting the first power into the second power, or converting the second power into the first power, wherein a voltage of the first power is greater than a voltage of the second power; the switch comprising a control end, an inverting output end, and a non-inverting output end, wherein the switch has a non-rectangle SOA, and wherein a control voltage exists between the control end and the non-inverting output end, and a cross voltage exists between the inverting output end and the non-inverting output end, wherein when the switch switches the capacitor to perform power conversion, an operation locus corresponding to a relationship between the control voltage and the cross voltage is limited in the non-rectangle SOA.

In one embodiment, the switch is a metal oxide semiconductor (MOS) transistor, wherein the control end is a gate; the inverting output end is a drain; and the non-inverting output end is a source.

In one embodiment, the non-rectangle SOA includes an inflection point.

In one embodiment, a turning point withstand voltage corresponding to the inflection point is less than the open-circuit withstand voltage of the switch.

In one embodiment, the turning point withstand voltage corresponding to the inflection point is 1/10 to 1/5 times the open-circuit withstand voltage of the switch.

In one embodiment, a voltage of the control end corresponding to the inflection point is greater than a turn-on threshold voltage of the switch.

In one embodiment, a voltage of the control end corresponding to the inflection point is less than a turn-on threshold voltage of the switch.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 4:
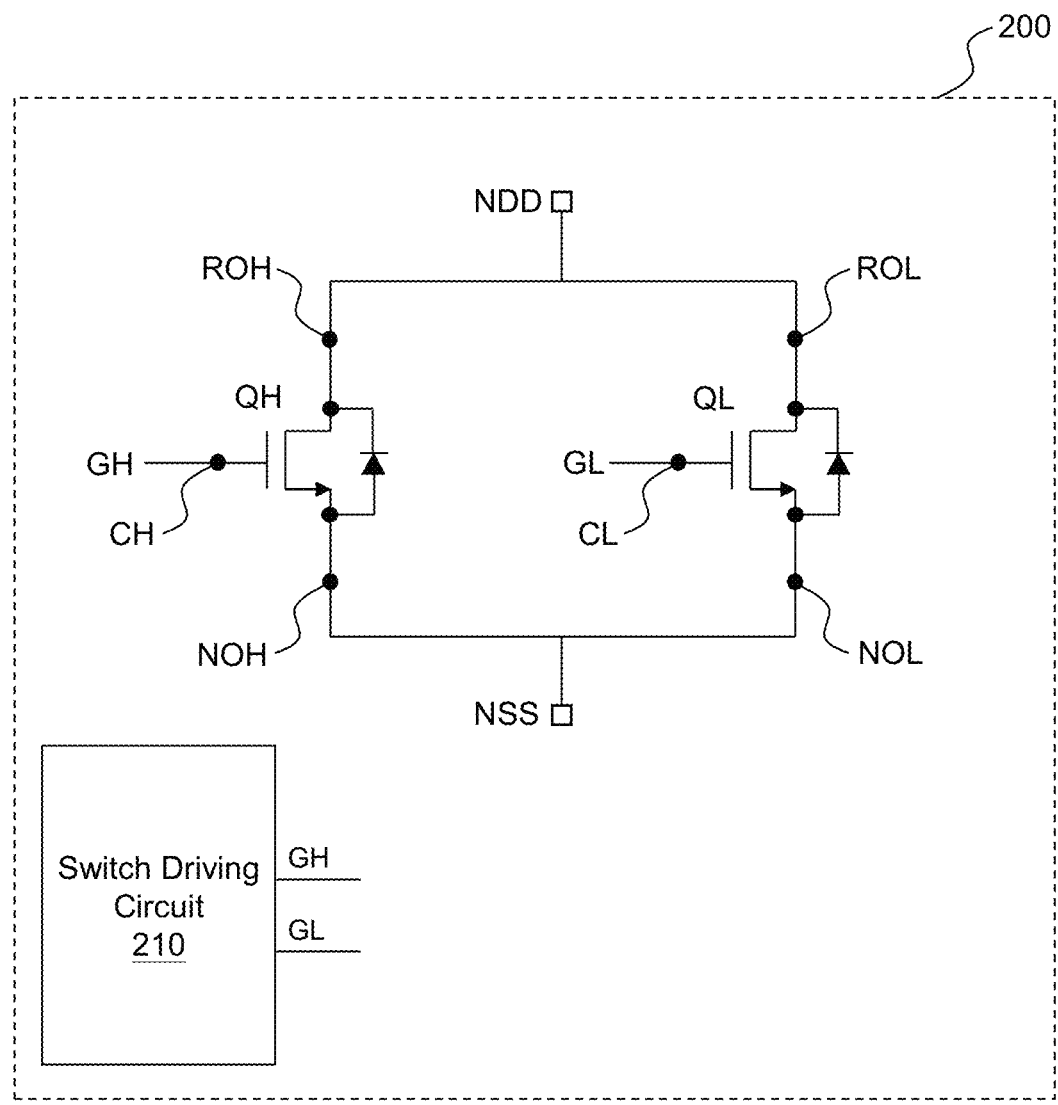
FIG. 4 is a schematic diagram of a switch circuit according to an embodiment of the present invention.

Referring to FIG. 4, which is a schematic diagram of a switch circuit 200 according to an embodiment of the present invention. As shown in FIG. 4, the switch circuit 200 includes a first switch QH, a second switch QL, and a switch driving circuit 210, wherein the first switch QH includes a first control end CH, a first inverting output end ROH, and a first non-inverting output end NOH, and the second switch QL includes a second control end CL, a second inverting output end ROL, and a second non-inverting output end NOL. The second inverting output end ROL and the first inverting output end ROH are coupled to a voltage input end NDD, and the second non-inverting output end NOL and the first non-inverting output end NOH are coupled to a voltage output end NSS. That is, the current conduction paths (i.e., between the corresponding inverting output end and the non-inverting output end) of the first switch QH and the second switch QL are connected in parallel. The switch driving circuit 210 is coupled to the first control end CH and the second control end CL, wherein the switch driving circuit 210 is configured to generate a first control signal GH and a second control signal GL, to control the conduction of the first switch QH and the second switch QL, respectively.

In some embodiments, a layout area of the first switch QH is less than a layout area of the second switch QL, wherein a ratio of the layout area of the first switch QH to the layout area of the second switch QL ranges from 1/5 to 1/3, that is, the layout area of the second switch QL is 3 to 5 times the layout area of the first switch QH, and preferably 3 times, 4 times, or 5 times. The layout area of the switch will affect its conduction capacitance and parasitic capacitance. Therefore, when the layout area of the first switch QH is less than the layout area of the second switch QL, the conduction resistance of the first switch QH is greater than the conduction resistance of the second switch QL, and the parasitic capacitance of the first control end CH is less than the parasitic capacitance of the second control end CL. In some embodiments, the first switch QH and the second switch QL are components manufactured by a same process; for example, the first switch QH and the second switch QL are both metal-oxide-semiconductor field-effect transistors (MOSFETs) or bipolar transistors (BJTs), having the same process parameters. In some embodiments, when the first switch QH is a MOSFET, the first control end CH corresponds to a gate of the MOSFET; the first inverting output end ROH corresponds to a drain of the MOSFET; and the first non-inverting output end NOH corresponds to a source of the MOSFET. When the second switch QL is a MOSFET, the second control end CL corresponds to a gate of the MOSFET; the second inverting output end ROL corresponds to a drain of the MOSFET; and the second non-inverting output end NOL corresponds to a source of the MOSFET. In some embodiments, the first switch QH and the second switch QL of the switch circuit 200 are both MOSFETs, wherein the first control end CH and the second control end CL are gates, the first inverting output end ROH and the second inverting output end ROL are drains, and the first non-inverting output end NOH and the second non-inverting output end NOL are sources.

Figure 5:
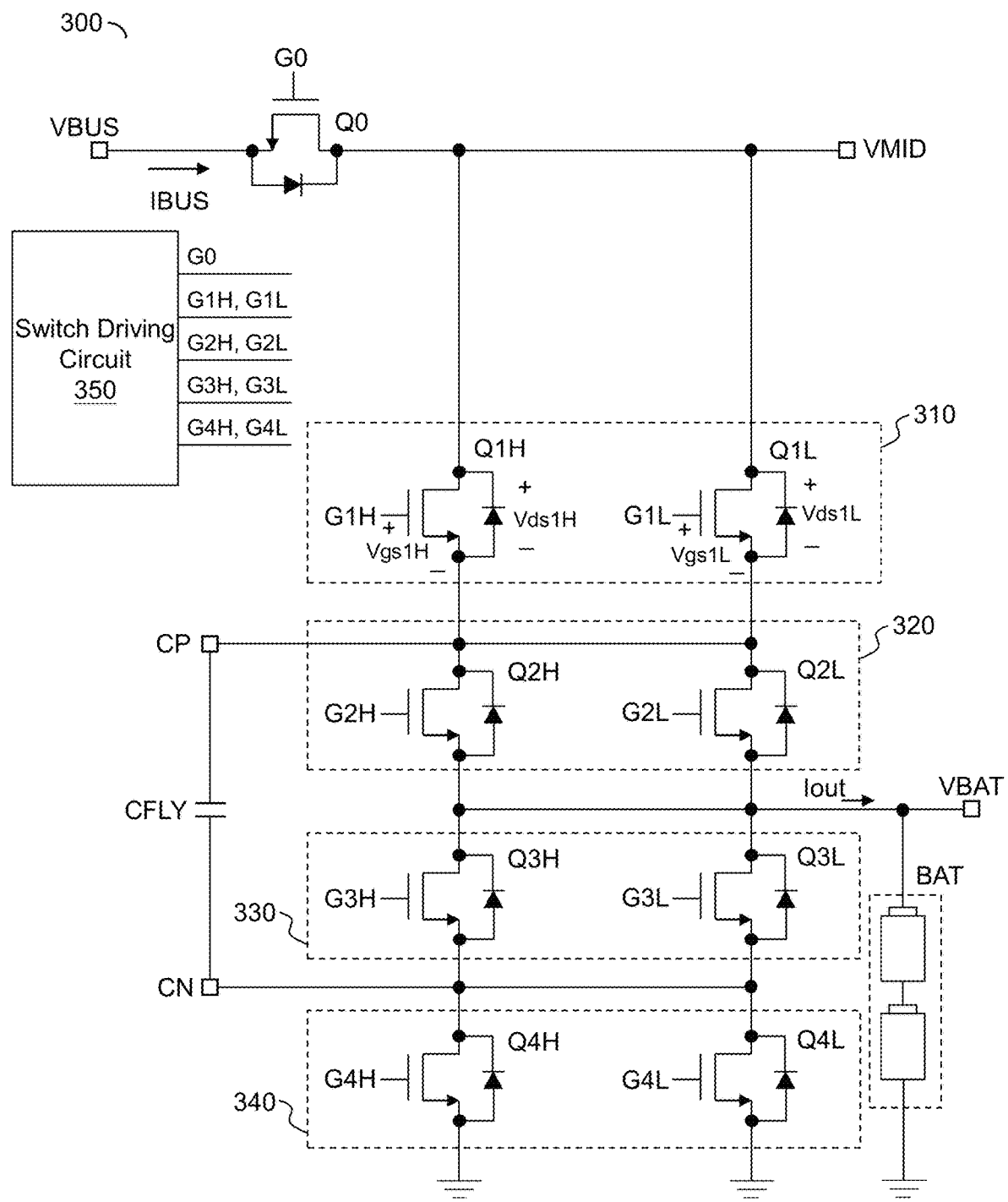
FIG. 5 is a schematic diagram of a switched capacitor converter according to an embodiment of the present invention.

In some embodiments, the switch circuit 200 is applied to a switched capacitor converter 300. Referring to FIG. 5, which is a schematic diagram of a switched capacitor converter 300 according to an embodiment of the present invention. The switched capacitor converter 300 includes plural switch units. The plural switch units are configured to switch coupling relationships among a capacitor CFLY, a first power VMID, and a second power VBAT, thereby converting the first power VMID (which is for example an intermediate power of USB system) into the second power VBAT (which is for example a battery voltage), or converting the second power VBAT into the first power VMID, wherein the voltage of the first power VMID is greater than the voltage of the second power VBAT.

In some embodiments, the switched capacitor converter 300 can be used in, for example, a USB PD charging system and/or a USB PD power supply system (i.e., On-The-Go (OTG) plug and play). In some embodiments, the switched capacitor converter 300 further includes a path switch Q0 for controlling the conduction between the first power VMID and the power supply VBUS. In the constant current charging mode, the switched capacitor converter 300 can be configured to multiply the current IBUS of the power supply to generate a high output current to charge the battery BAT. The switched capacitor converter 300 also can operate in the constant voltage charging mode, or in the OTG mode, to multiply the battery voltage VBAT to generate the first power VMID, and output the power supply VBUS to the outside.

In some embodiments, the switched capacitor converter 300 includes four switch units: a first switch unit 310, a second switch unit 320, a third switch unit 330, and a fourth switch unit 340, wherein at least one of the first switch unit 310, the second switch unit 320, the third switch unit 330, and the fourth switch unit 340 includes the switch circuit 200. In the present embodiment (as shown in FIG. 5), the first switch unit 310, the second switch unit 320, the third switch unit 330, and the fourth switch unit 340 all include the switch circuit 200, wherein the first switch unit 310 includes the first switch Q1H and the second switch Q1L, the second switch unit 320 includes the first switch Q2H and the second switch Q2L, the third switch unit 330 includes the first switch Q3H and the second switch Q3L, and the fourth switch unit 340 includes the first switch Q4H and the second switch Q4L. In the present embodiment, all the switch driving circuits 210 in the plural switch circuits 200 can be integrated into one switch driving circuit 350 configured to generate the control signals G0, G1L-G4L, and G1H-G4H to control the corresponding switches. In other embodiments, it can be arranged that not all switch units include the switch circuit 200 (for example, only one switch unit in the plural switch units includes the switch circuit 200); the number of switch circuits 200 can be decided as required or preferred.

In some embodiments, the switch circuit 200 adopts split switches technology to reduce the negative influence of the Miller effect caused by the parasitic capacitance of the first switch QH and the second switch QL, so that the switching loss of the first switch QH and the second switch QL can be reduced, thereby reducing the overall loss of the switched capacitor converter 300. (Miller effect is well known to those with ordinary knowledge in the technical field to which the present invention pertains, so it is not explained in detail herein.) The principle of the split switches technology and the operation process of the switched capacitor converter 300 will be described in detail below.

Figure 6A:
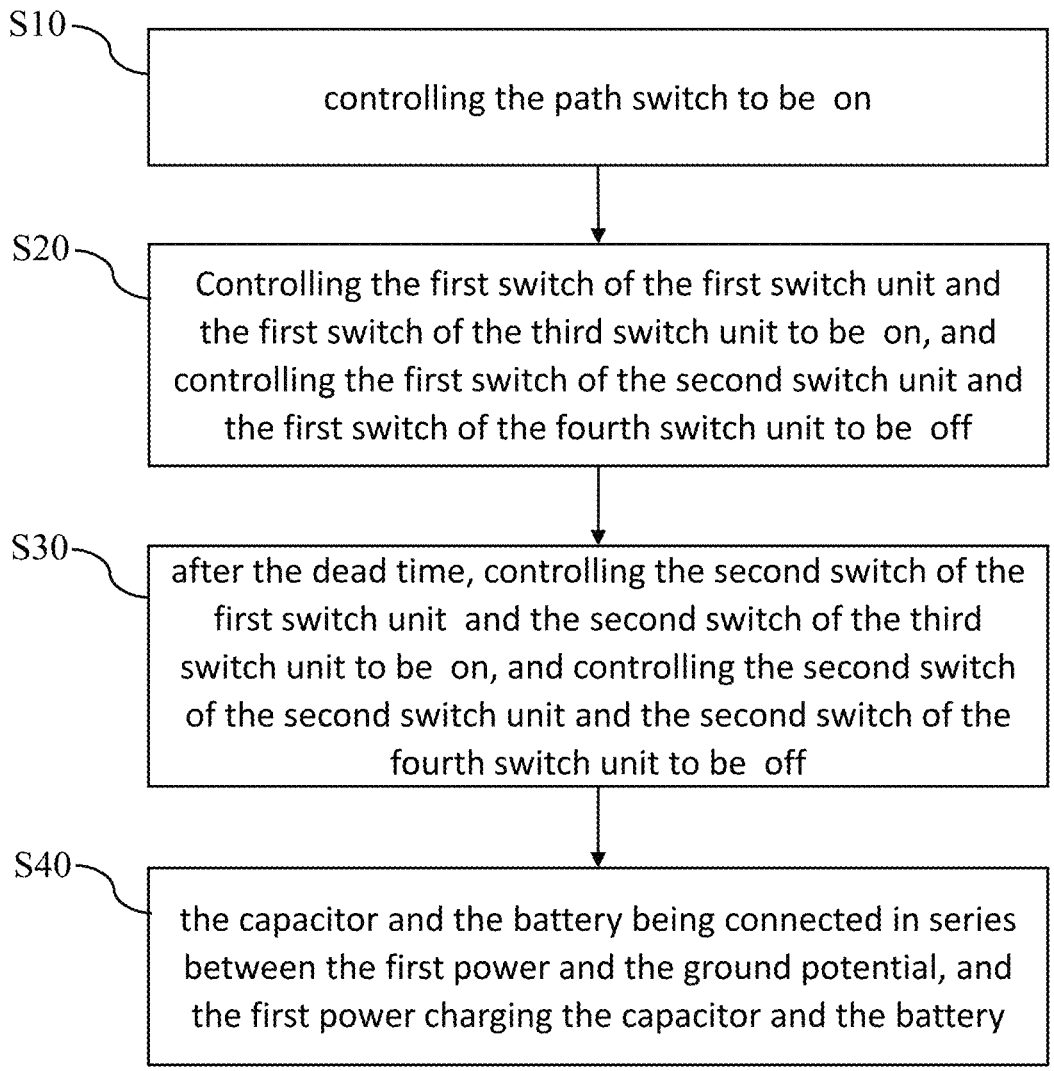
FIG. 6A is an operation flow chart (1) of a switched capacitor converter according to an embodiment of the present invention.
Figure 6B:
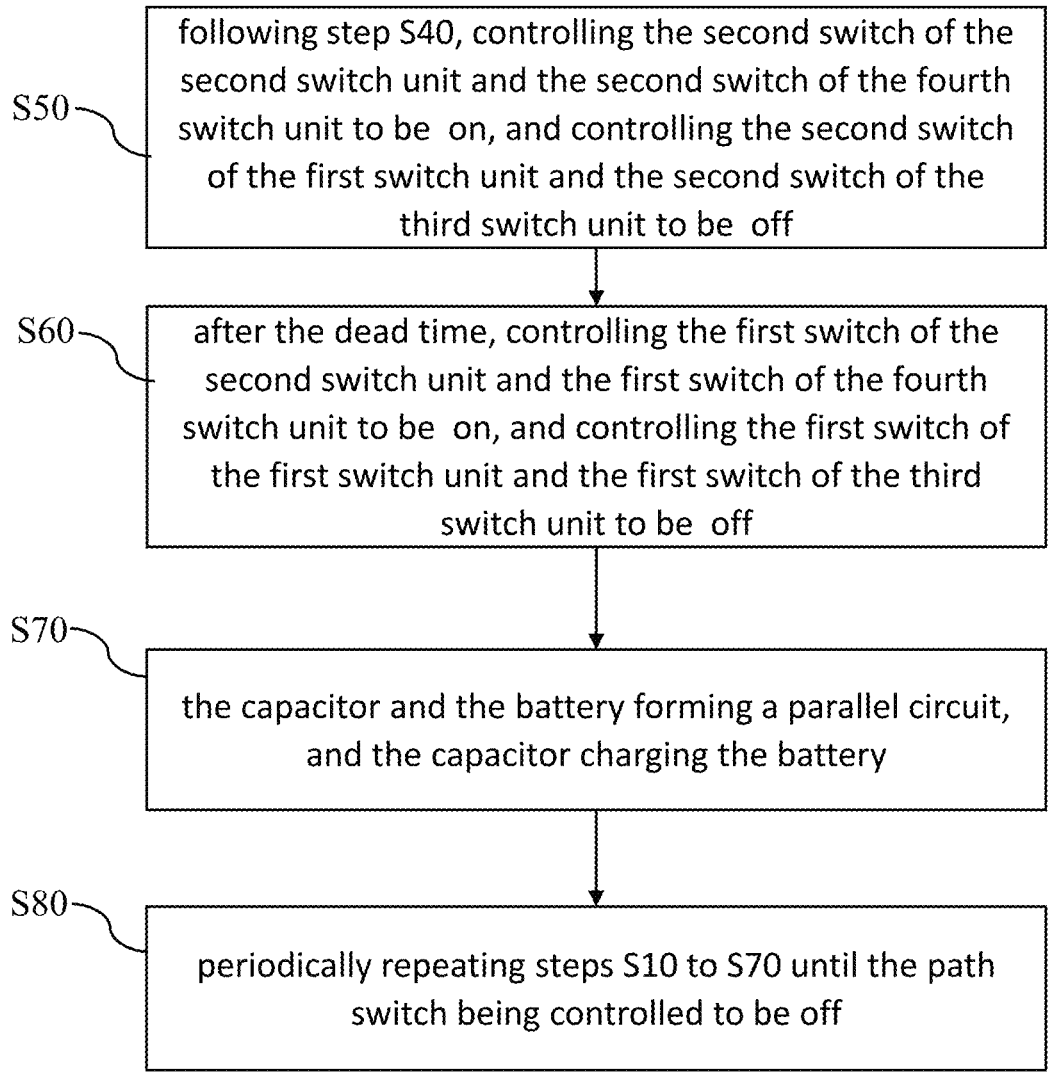
FIG. 6B is an operation flow chart (2) of a switched capacitor converter according to an embodiment of the present invention.
Figure 7:
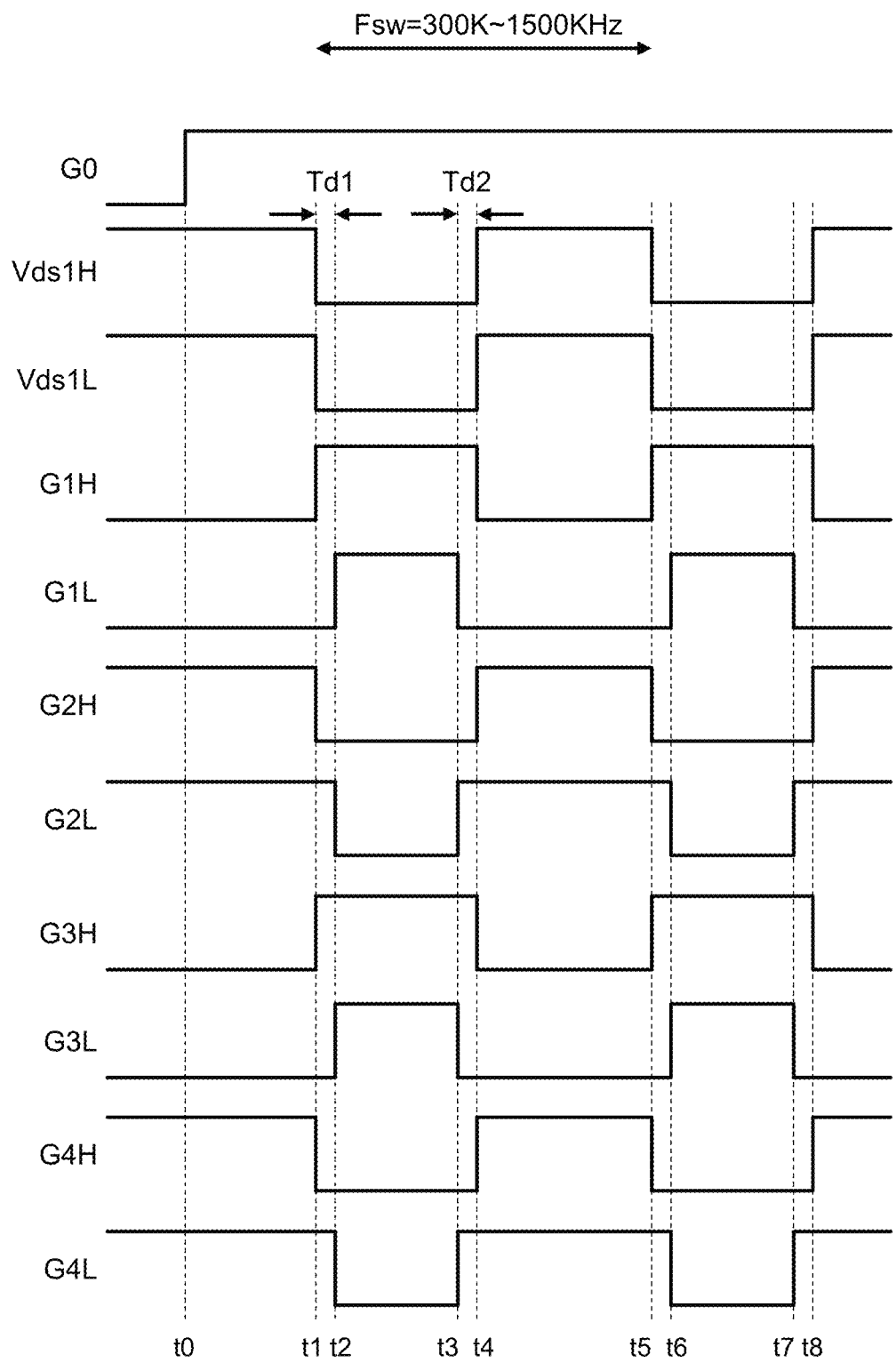
FIG. 7 is an operation waveform diagram of a switched capacitor converter according to an embodiment of the present invention.

Please refer to FIGS. 6A, 6B, and 7. FIGS. 6A and 6B are operation flow charts of the switched capacitor converter 300 according to an embodiment of the present invention, and FIG. 7 is an operation waveform diagram of the switched capacitor converter 300 according to an embodiment of the present invention. As shown in FIG. 6A and FIG. 7, when the switched capacitor converter 300 starts operating, the switch driving circuit 350 of the switched capacitor converter 300 controls the path switch Q0 to be turned on by the control signal G0 (step S10 in FIG. 6A, time point t0 in FIG. 7), and at this state, the voltage of the first power VMID is equal to the voltage of the power supply VBUS. Subsequently, the switching drive circuit 350 controls the first switch Q1H of the first switch unit 310 and the first switch Q3H of the third switch unit 330 to be turned on through the control signals G1H and G3H, respectively, and controls the first switch Q2H of the second switch unit 320 and the first switch Q4H of the fourth switch unit 340 to be turned off through the control signals G2H and G4H, respectively (step S20, time point t1). After the dead time Td1 (in the present embodiment, dead time Td1 is less than 30 nanoseconds, for example), the switch driving circuit 350 controls the second switch Q1L of the first switch unit 310 and the second switch Q3L of the third switch unit 330 to be turned on through control signals G1L and G3L, respectively, and controls the second switch Q2L of the second switch unit 320 and the second switch Q4L of the fourth switch unit 340 to be turned off through the control signals G2L and G4L, respectively (step S30, time point t2).

When the first switch unit 310 and the third switch unit 330 are turned on, and the second switch unit 320 and the fourth switch unit 340 are turned off (as shown from time point t1 to time point t4), the capacitor CFLY forms a series circuit with the battery BAT, wherein the capacitor CFLY and the battery BAT are connected in series between the first power VMID and the ground potential. At this state, the first power VMID charges both the capacitor CFLY and the battery BAT (step S40, hereinafter referred to as the first state).

Following step S40 (as shown in FIG. 6B and FIG. 7), the switching drive circuit 350 controls the second switch Q2H of the second switch unit 320 and the second switch Q4L of the fourth switch unit 340 to be turned on through the control signals G2L and G4L, respectively, and controls the second switch Q1L of the first switch unit 310 and the second switch Q3L of the third switch unit 330 to be turned off through the control signals G1L and G3L, respectively (step S50, time point t3). After the dead time Td2 (in the present embodiment, dead time Td1 is less than 30 nanoseconds, for example), the switch driving circuit 350 controls the first switch Q2H of the second switch unit 320 and the first switch Q4H of the fourth switch unit 340 to be turned on through control signals G2H and G4H, respectively, and controls the first switch Q1H of the first switch unit 310 and the first switch Q3H of the third switch unit 330 to be turned off through the control signals G1H and G3H, respectively (step S60, time point t4). When the second switch unit 320 and the fourth switch unit 340 are turned on, and the first switch unit 310 and the third switch unit 330 are turned off (as shown from time point t5 to time point t8), the capacitor CFLY forms a parallel circuit with the battery BAT, and at this state, the capacitor CFLY discharges to charge the battery BAT (step S70, hereinafter referred to as the second state).

In some embodiments, due to the periodic switching of the plural switch units, the coupling of the capacitor CFLY and the battery BAT is periodically switched between the first state and the second state. In a steady state, the voltage of the first power VMID is twice the voltage of the second power VBAT according to the capacitance voltage divider rule. For example, assuming that the voltage of the power supply VBUS is 20 volts (V), then, the voltage of the first power VMID is 20 volts and the voltage of the second power VBAT is 10 volts. In addition, assuming that the switching and conduction losses are ignored, the input and output powers are approximately equal, and therefore the current of the first power VMID is ½ times the current of the second power VBAT. For example, assuming that the current IBUS of the power supply is 5 ampere, then the current of the second power VBAT is 10 ampere. The switch driving circuit 350 periodically repeats steps S10 to S70 until the switch driving circuit 350 generates a control signal G0 to control the path switch Q0 to be turned off, and the switch driving circuit 350 stops operating (step S80).

Taking FIG. 7 and the switching process of the first switch unit 310 (corresponding to the aforementioned switch circuit 200) as an example, the principle of the split switches technology has two important points. One is that the switch driving circuit 210 first controls the first switch QH (such as the first switch Q1H of first switch unit 310) which has a smaller parasitic capacitance to be turned on (as indicated by the time point t1) to reduce the loss caused by the Miller effect. In addition, since the current conduction paths of the first switch QH and the second switch QL (such as the second switch Q1L of first switch unit 310) are connected in parallel, when the second switch QL is turned on, the voltage difference (i.e., cross voltage Vds1L) between the second inverting output end ROL and the second non-inverting output end NOL is less than a predetermined voltage difference target value. For example, when the second switch Q1L of the first switch unit 310 is turned on at the time point t2, since the first switch Q1H of the first switch unit 310 has already been turned on so that the cross voltage Vds1H of the first switch Q1H and the cross voltage Vds1L of the second switch Q1L are both zero, when the second switch Q1L is turned on at time point t2, its parasitic capacitance (for example, the gate-drain capacitance of the second switch Q1L) will not generate the Miller effect. Thus, the switching loss of the switch circuit 200 (for example, corresponding to the first switch unit 310) is less than a predetermined target value. That is to say, the loss of Miller effect caused by the larger parasitic capacitance of the second switch QL of the switch circuit 200 is reduced due to turning on the first switch QH of the switch circuit 200 first. In addition, since the parasitic capacitance of the first switch QH is smaller, when the first switch QH is turned on first, the loss caused by the Miller effect can also be greatly reduced.

On the other hand, when the second switch Q1L of the first switch unit 310 is turned off at the time point t3, since the first switch Q1H of the first switch unit 310 is still turned on so that the cross voltage Vds1H of the first switch Q1H and the cross voltage Vds1L of the second switch Q1L are still zero, when the second switch Q1L is turned off at the time point t3, its parasitic capacitance (for example, the gate-drain capacitance of the second switch Q1L) will not generate the Miller effect. Thus, the switching loss of the switch circuit (for example, corresponding to the first switch unit 310) is less than a predetermined target value.

In addition, during a main conduction period of the split switches technology (as shown from the time point t2 to the time point t3), the second switch QL with a smaller conduction resistance is controlled by the switch driving circuit 210 to be turned on, so that the switch circuit 200 retains the advantage of a smaller conduction resistance (principle of parallel resistance). In other words, the split switches technology not only can reduce the negative influence of Miller effect caused by the parasitic capacitances of the first switch QH and the second switch QL of the switch circuit 200, but also can enable the switch circuit 200 to keep a smaller conduction resistance.

By the split switches technology, the second switch QL does not need to withstand a high voltage caused by ringing effect during switching. Therefore, the second switch QL can use a transistor with a smaller open-circuit withstand voltage. In some embodiments, the open-circuit withstand voltage of the second switch QL is less than the open-circuit withstand voltage of the first switch QH, wherein the open-circuit withstand voltage is defined as thus: when a voltage of the control end of the switch is zero (i.e., controlled to be off), a voltage between the inverting output end and the non-inverting output end of the switch that the switch can withstand. That is to say, the so-called open-circuit refers to the open-circuit between the inverting output end and the non-inverting output end when the switch is controlled to be off. In one embodiment, under the same unit area, a transistor with a smaller open-circuit withstand voltage has a smaller conduction resistance. Therefore, when the second switch QL is implemented with a transistor with a smaller open-circuit withstand voltage, the switch circuit can have a smaller conduction resistance, thereby further reducing the overall loss of the switch circuit 200.

Figure 3:
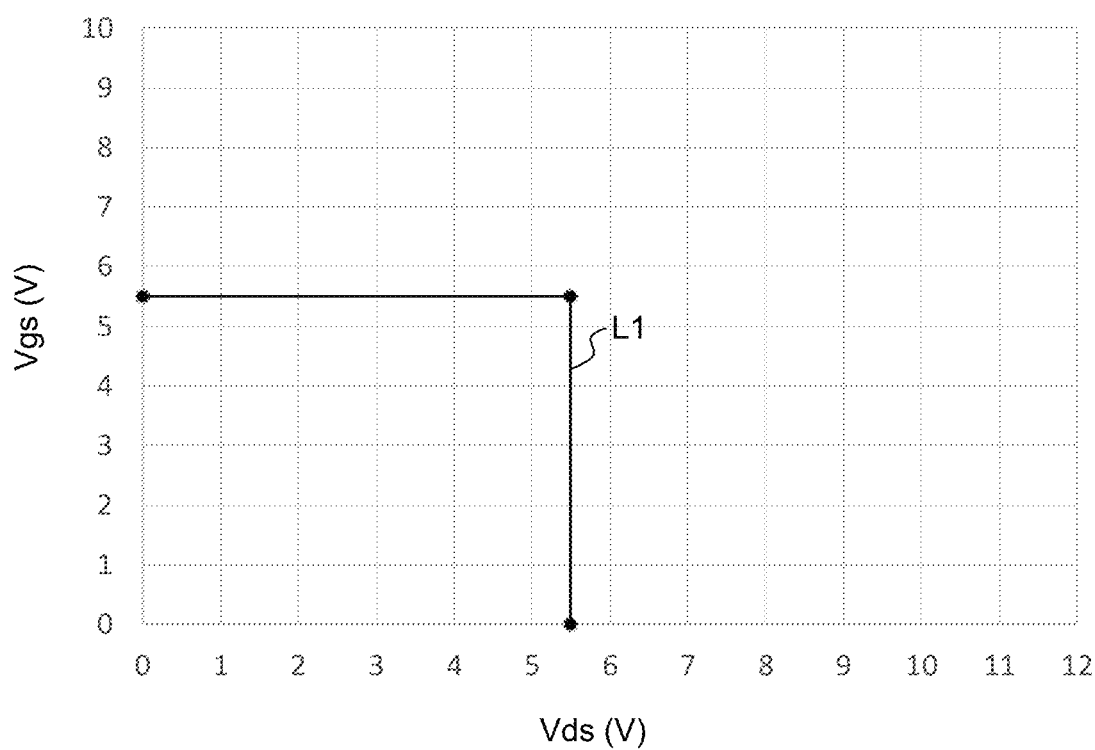
FIG. 3 is a characteristic diagram of a safe operating area (SOA) of a MOSFET according to a conventional art.

In some embodiments, the switch circuit 200 adopts a non-rectangle safe operating area (SOA) technology of MOSFET to reduce the conduction resistance of the first switch QH and/or the second switch QL. Compared with the conventional art with a rectangle SOA shown in FIG. 3, the non-rectangle SOA technology can reduce the conduction loss of the first switch QH and/or the second switch QL, thereby reducing the overall loss of switched capacitor converter 300.

Figure 8A:
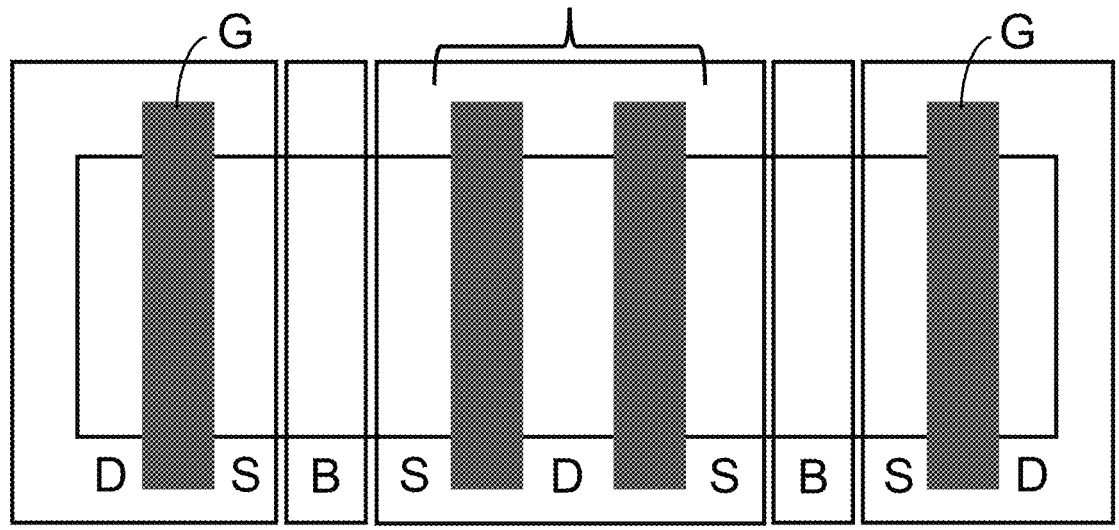
FIG. 8A is a schematic layout diagram of a MOSFET according to an embodiment of the present invention.
Figure 8B:
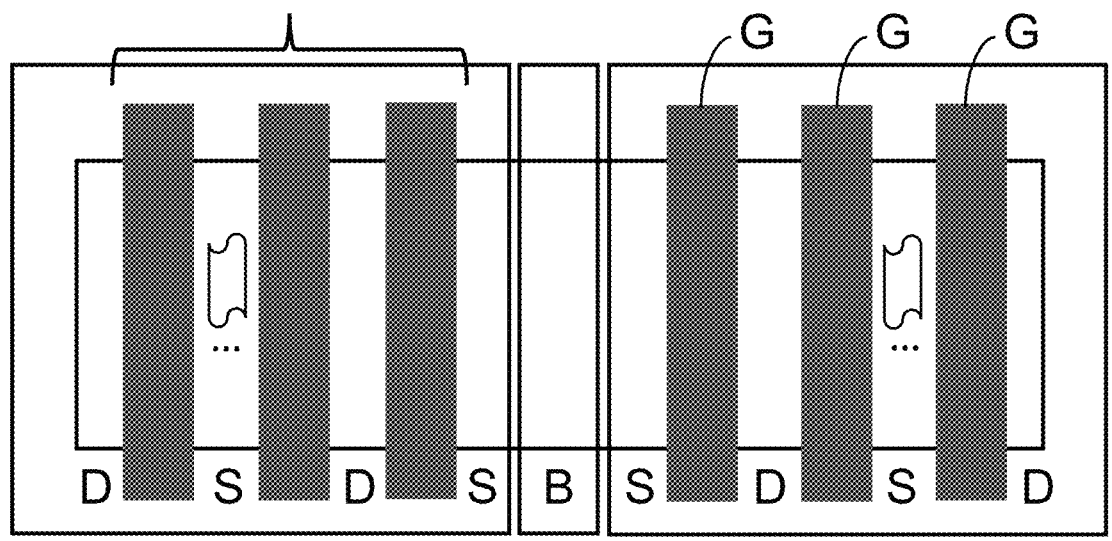
FIG. 8B is a schematic layout diagram of a MOSFET according to another embodiment of the present invention.

In some embodiments, the non-rectangle SOA can be achieved by reducing an area ratio of the body contact B. Please refer to FIG. 8A and FIG. 8B. FIG. 8A and FIG. 8B are schematic layout diagrams of MOSFETs according to different embodiments of the present invention, wherein FIG. 8A discloses a MOSFET with a 2-finger structure and FIG. 8B discloses a MOSFET with a 10-finger structure. The 2-finger MOSFET and the 10-finger MOSFET both include a gate G, a drain pole D, a source S, and a body contact B. The difference between the 2-finger MOSFET and the 10-finger MOSFET is that the area ratio of the body contact B is different. The area ratio of the body contact B will affect the conduction resistance of the switch, wherein when the area ratio of the body contact B is larger, an area ratio of the transistor channel of the MOSFET per unit area is smaller, and thus the conduction resistance is larger. When the area ratio of the body contact B is smaller, the area ratio of the transistor channel of the MOSFET per unit area is larger, and thus the conduction resistance is smaller. In the present embodiment (as shown in FIG. 8A and FIG. 8B), in the 2-finger MOSFET, one body contact B is provided for every two gates, while in the 10-finger MOSFET, one body contact B is provided for every ten gates. In other words, the area ratio of the body contact B in the 10-finger MOSFET is less than the area ratio of the body contact B in the 2-finger MOSFET, that is, the area of the transistor channel of the 10-finger MOSFET is larger. Therefore, under the same unit area, the conduction resistance of the 10-finger MOSFET will be smaller than the conduction resistance of the 2-finger MOSFET. In addition, for the same reason, the conduction resistances of the 10-finger MOSFET and the 2-finger MOSFET are both smaller than the conduction resistances of the MOSFET with the ring body contact B shown in FIG. 2.

Figure 9:
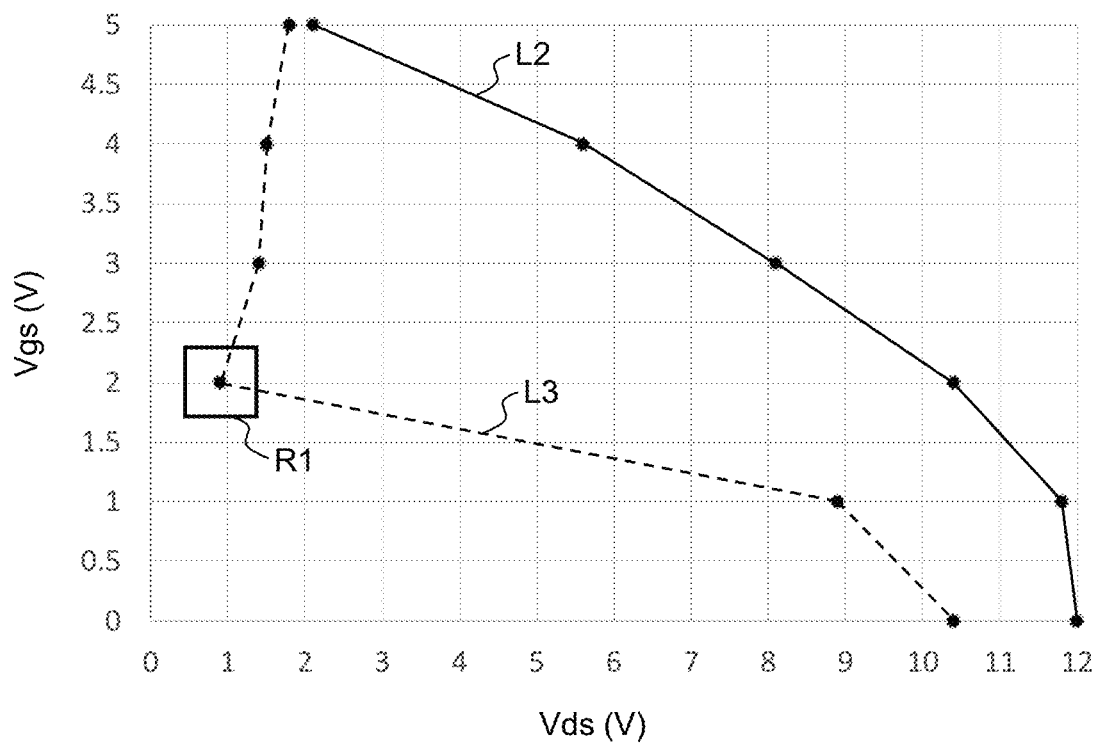
FIG. 9 is a characteristic diagram of the SOA of a MOSFET according to various embodiments of the present invention.

Further referring to FIG. 9, FIG. 9 is a characteristic diagram of a SOA of a MOSFET according to different embodiments of the present invention, wherein the continuous line L2 is the waveform of the SOA of the 2-finger MOSFET, the dash line L3 is the waveform of the SOA of the 10-finger MOSFET. In the characteristic diagram of FIG. 9, the horizontal axis represents the cross voltage of the MOSFET (i.e. gate-drain voltage Vds) in unit of volt, and the vertical axis represents the control voltage of the MOSFET (i.e. gate-source voltage Vgs) in unit of volt. As shown in FIG. 9, both the SOA of the 2-finger MOSFET and the SOA of the 10-finger MOSFET are non-rectangle, wherein the SOA of the 10-finger MOSFET has an inflection point (as indicated by the frame R1). The SOA is where the MOSFET can operate in safe conditions. Taking the solid line L2 as an example, when the control voltage of the 2-finger MOSFET is 3V, the cross voltage of the 2-finger MOSFET should not be greater than about 8 volts, so as to prevent the breakdown or damage of the 2-finger MOSFET. Taking the dashed line L3 as an example, when the control voltage of the 10-finger MOSFET is 1 volt, the cross voltage of the 10-finger MOSFET should not be greater than about 9 volts, so as to prevent the breakdown or damage of the 10-finger MOSFET.

In some embodiments, the SOA of the first switch QH and/or the second switch QL of the switch circuit 200 is non-rectangle, wherein the first switch QH and/or the second switch QL are 10-finger MOSFETs to reduce the conduction resistance, so that the conduction loss of the first switch QH and/or the second switch QL can be reduced, thereby reducing the overall loss of the switched capacitor converter 300.

Figure 1:
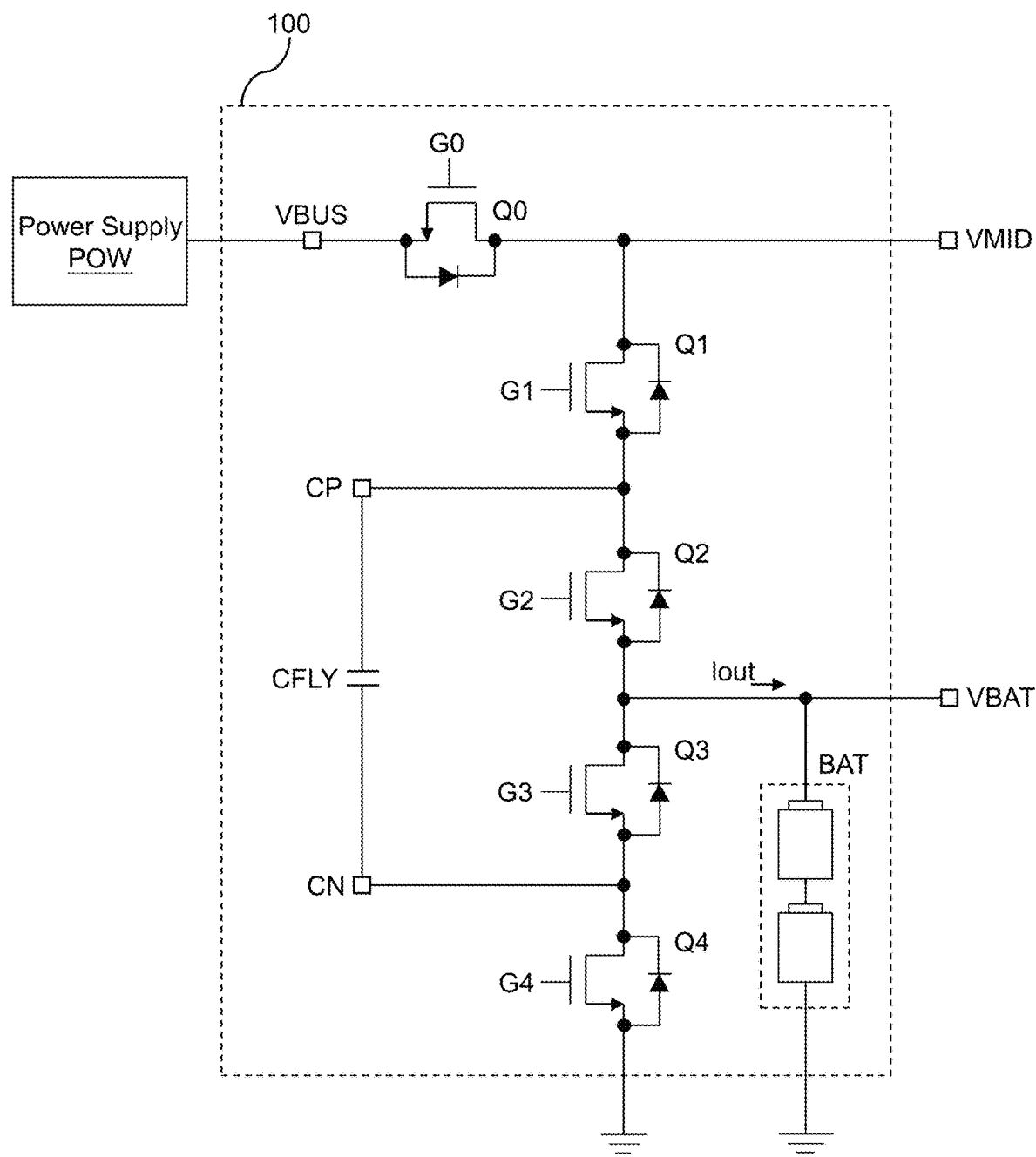
FIG. 1 is a schematic diagram of a switched capacitor converter according to a conventional art.
Figure 2:
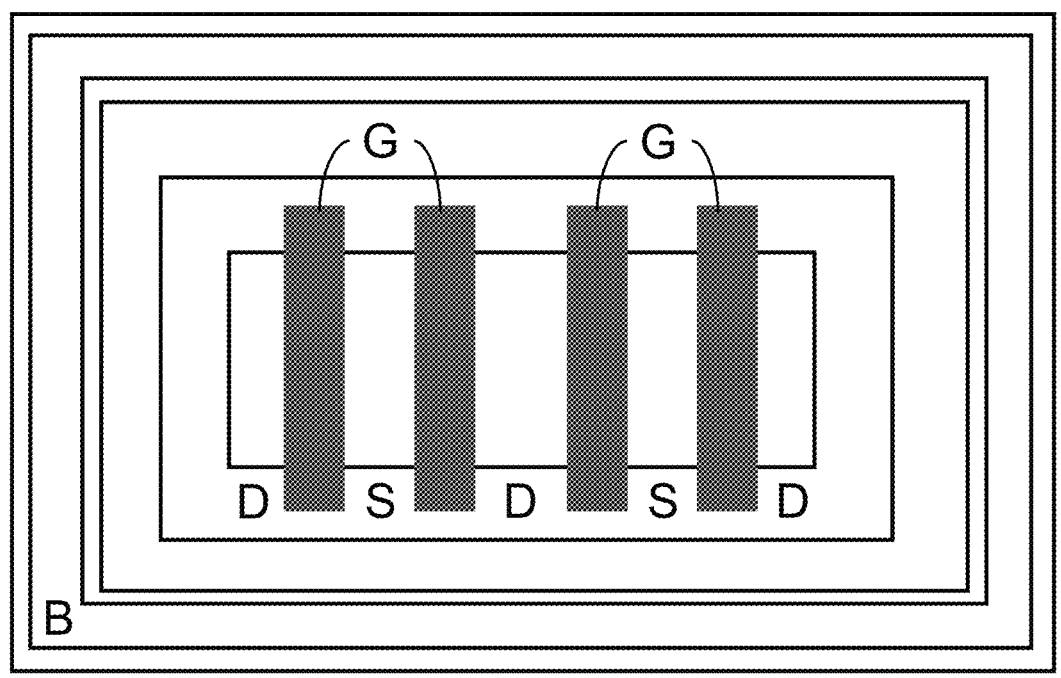
FIG. 2 is a schematic layout diagram of a metal-oxide-semiconductor field-effect transistor (MOSFET) according to a conventional art.

In some embodiments, under the same unit area, the switch with a non-rectangle SOA (for example, 2-finger MOSFET or 10-finger MOSFET) will have a conduction resistance which is less than the conduction resistance of a switch with a rectangle SOA (for example, the MOSFET with ring body contact B in FIG. 2). In one embodiment, the above-mentioned relative relationship of the conduction resistances exists even when the coverage scope of the non-rectangle SOA is less than the coverage scope of the rectangle SOA.

Figure 10A:
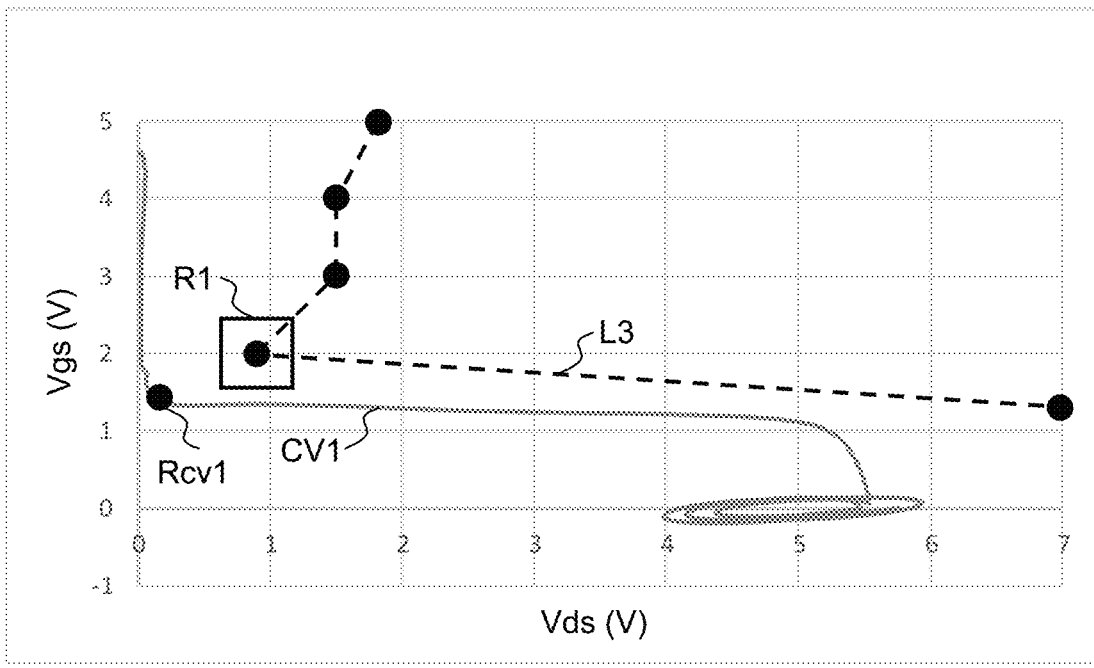
FIG. 10A shows an operation locus diagram drawn according to a relationship between a control voltage (Vgs) and a cross voltage (Vds) of a first switch and a characteristic diagram of the SOA thereof according to an embodiment of the present invention.
Figure 10B:
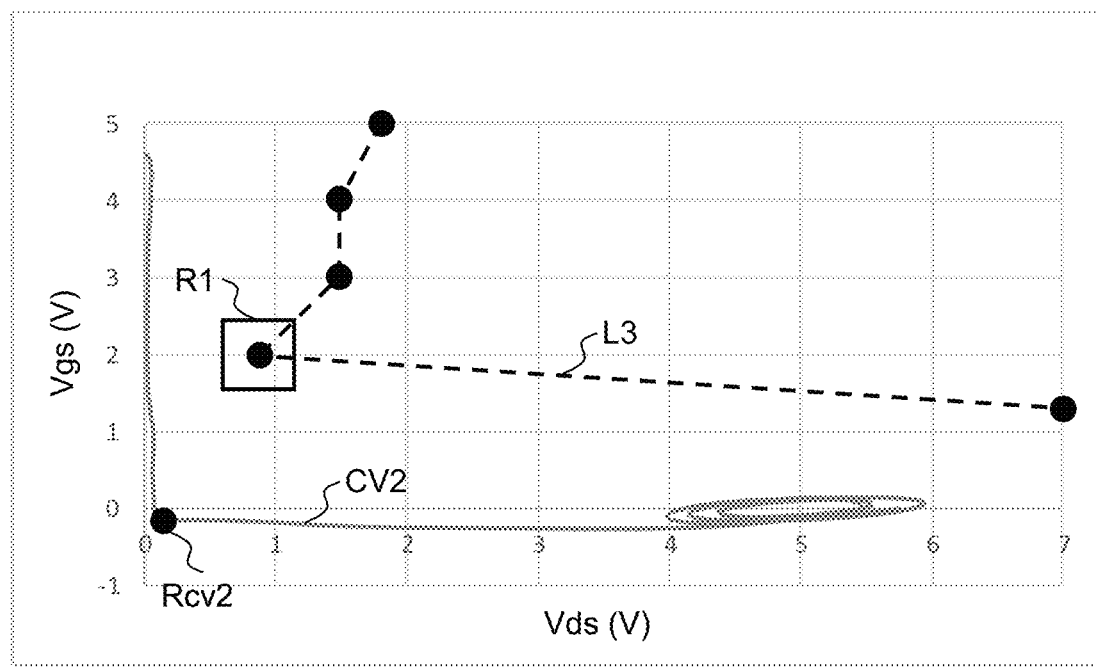
FIG. 10B shows an operation locus diagram drawn according to a relationship between a control voltage (Vgs) and a cross voltage (Vds) of a second switch and a characteristic diagram of the SOA thereof according to an embodiment of the present invention.

Referring to FIG. 10A and FIG. 10B, FIG. 10A shows an operation locus CV1 drawn according to a relationship between a control voltage Vgs (for example, corresponding to the control voltage Vgs1H of the first switch Q1H of the first switch unit 310 in FIG. 5) and a cross voltage Vds (for example, corresponding to the cross voltage Vds1H of the first switch Q1H of the first switch unit 310 in FIG. 5) of a first switch QH and a characteristic diagram of the SOA (L3) thereof according to an embodiment of the present invention. FIG. 10B shows an operation locus CV2 drawn according to a relationship between a control voltage Vgs (for example, corresponding to the control voltage of the first switch Q1H of the first switch unit 310 in FIG. 5) and a cross voltage Vds (for example, corresponding to the cross voltage Vds1L of the first switch Q1H of the first switch unit 310 in FIG. 5) of a second switch QL and a characteristic diagram of the SOA (L3) thereof according to an embodiment of the present invention. It should be noted that, the operation locus CV1 and CV2 are characteristic curves obtained by recording the control voltage and the cross voltage of the first switch Q1H of the first switch unit 310 and the second switch Q1L of the first switch unit 310 when the switched capacitor converter 300 as shown in FIG. 5 performs periodically switching.

As shown in FIG. 10A, the operation locus CV1 of the relationship between the control voltage and the cross voltage of the first switch QH falls within the coverage scope of the SOA of the 10-finger MOSFET. As shown in FIG. 10B, the operation locus CV2 of the relationship between the control voltage and the cross voltage of the second switch QL also falls within the coverage scope of the SOA of the 10-finger MOSFET. That is, when both the first switch QH and the second switch QL use 10-finger MOSFETs, both the first switch QH and the second switch QL can operate safely without any problem of breakdown or damage.

Figure 10C:
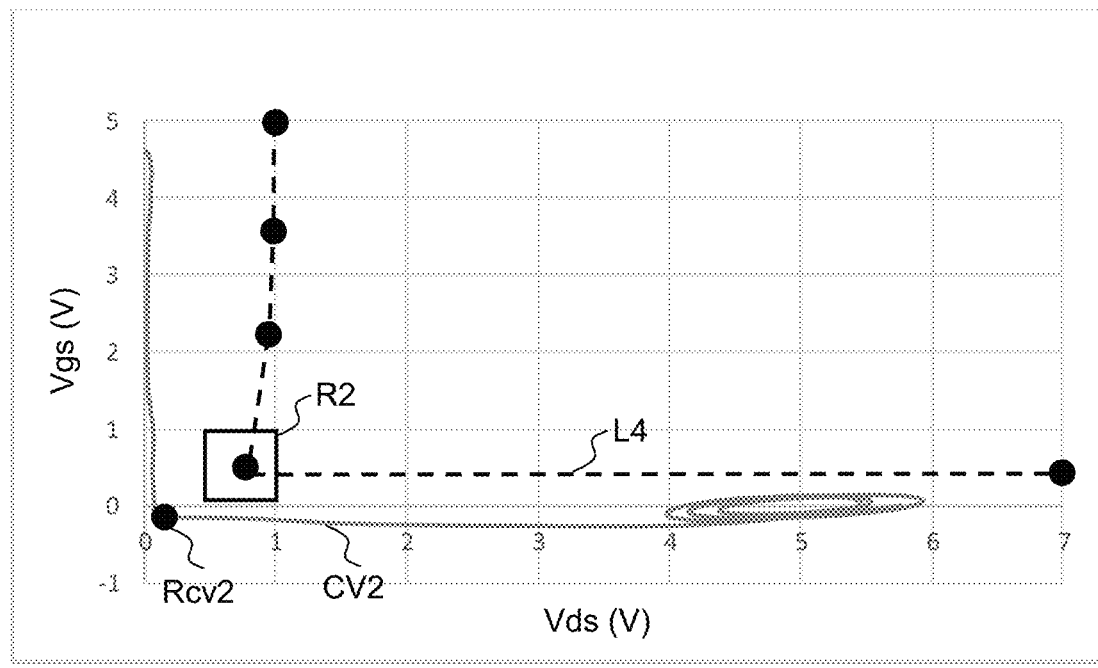
FIG. 10C shows an operation locus diagram drawn according to a relationship between a control voltage and a cross voltage of a second switch and a characteristic diagram of the SOA thereof according to another embodiment of the present invention.

Further referring to FIG. 10C, FIG. 10C is an operation locus CV2 drawn according to a relationship between the control voltage and the cross voltage of the second switch QL and a characteristic diagram of the SOA (L4) thereof according to another embodiment of the present invention.

As shown in FIG. 10C, in some embodiments, since the operation locus CV2 of the relationship between the control voltage and the cross voltage of the second switch QL is very close to the horizontal axis (Vds) and the vertical axis (Vgs), the area coverage scope of the SOA (L4) of the second switch QL can be less than the area coverage scope of the SOA (L3) of the first switch QL. Specifically, as shown in FIG. 10C, for example, the second switch QL can use a MOSFET with a smaller area ratio of the body contact B (for example, 15-finger MOSFET), so that the second switch QL has a SOA (L4) with a smaller area coverage and an inflection point closer to zero (as indicated by the dash line L4 and the frame R2), whereby the second switch QL can have an even smaller conduction resistance to further reduce the conduction loss.

In some embodiments, since the second switch QL can use a MOSFET with a smaller area ratio of the body contact B, or can use a transistor with a smaller open-circuit withstand voltage, the sheet resistance of the second switch QL is less than the sheet resistance of the first switch QH, wherein the sheet resistance is defined as the resistance of the switch per unit area.

In the rectangle SOA as shown in FIG. 2, there is no inflection point. In contrast, in some embodiments, the SOA of the transistor (for example, the second switch QL) of the present invention has an inflection point (as indicated by the frame R1 in FIG. 9), wherein a turning point withstand voltage corresponding to the inflection point is less than the open-circuit withstand voltage of the second switch QL. It can be seen from the above description that as the SOA becomes smaller, the sheet resistance becomes smaller. Therefore, as the turning point withstand voltage becomes smaller, the sheet resistance becomes smaller. In some embodiments, the turning point withstand voltage is 1/10 to 1/5 times the open-circuit withstand voltage of the second switch QL, that is, the open-circuit withstand voltage of the second switch QL is 5 to 10 times the turning point withstand voltage, and preferably 5 times, 6 times, 7 times, 8 times, 9 times, or 10 times, so that the second switch QL can have a smaller sheet resistance.

In some embodiments, for a transistor having an inflection point according to the present invention, the control voltage corresponding to the inflection point is greater than the turn-on threshold voltage of the transistor. Since the first switch QH of the switch circuit 200 needs to be turned on when its cross voltage is higher and turned off when its cross voltage is lower, thus, as shown in FIG. 10A, the control voltage (Vgs) corresponding to the turning point Rcv1 of the operation locus CV1 is greater than the turn-on threshold voltage of the first switch QH. In some embodiments, the turning point control voltage (i.e., Vgs corresponding to turning point R1) of the SOA of the first switch QH (for example, the first switch Q1H of the first switch unit 310 in FIG. 5) is greater than the turn-on threshold voltage of the first switch Q1H.

Please refer to FIG. 10B and FIG. 10C. In some embodiments, since the cross voltage of the second switch QL of the switch circuit 200 is lower (for example, 0 volts) when it is turned on, or the cross voltage is higher when it is turned off, the control voltage (Vgs) corresponding to the turning point Rcv2 of the operation locus CV2 is almost equal to zero volts. Therefore, in one embodiment, the second switch QL (for example, the second switch Q1L of the first switch unit 310 in FIG. 5) can use a transistor with the same SOA as the first switch QH (as L3 in FIG. 10B), while in another embodiment, as shown in FIG. 10C, the second switch QL (for example, the second switch Q1L of the switch unit 310 in FIG. 5) can use a transistor with a smaller coverage scope of the SOA than that of the first switch QH (as L4 in FIG. 10C). Therefore, in some embodiments, the turning point control voltage (i.e., Vgs corresponding to the turning point R2) of the SOA of the second switch QL (for example, the second switch Q1L of the first switch unit 310 in FIG. 5) is less than the turn-on threshold voltage of the second switch QL.

In one embodiment, the turning point control voltage (i.e., Vgs corresponding to turning point R2) of the SOA of the second switch QL (for example, the second switch Q1L of the first switch unit 310 in FIG. 5) is less than the turning point control voltage (i.e., Vgs corresponding to turning point R1) of the SOA of the first switch QH (for example, the first switch Q1H of the first switch unit 310 in FIG. 5).

In some embodiments, the switch circuit 200 uses a clamping circuit technology to limit a voltage difference between the first inverting output end ROH and the first non-inverting output end NOH and/or a voltage difference between the second inverting output end ROL and the second non-inverting output end NOL, so that the size of the first switch QH and/or the second switch QL can be reduced, thereby reducing the conduction resistance of the first switch QH and/or the second switch QL. In other words, in some embodiments, the switch circuit 200 further includes a clamper, wherein the clamper can indirectly reduce the conduction loss of the first switch QH and/or the second switch QL, thereby reducing the overall loss of the switched capacitor converter 300. In some embodiments, the clamper can include, for example, a Zener diode, or a diode-coupled transistor (i.e. a transistor coupled to form a diode) to achieve the clamping effect. The clamper is well known to those with ordinary knowledge in the technical field to which the present invention pertains, so its detailed explanation is omitted here.

Figure 11:
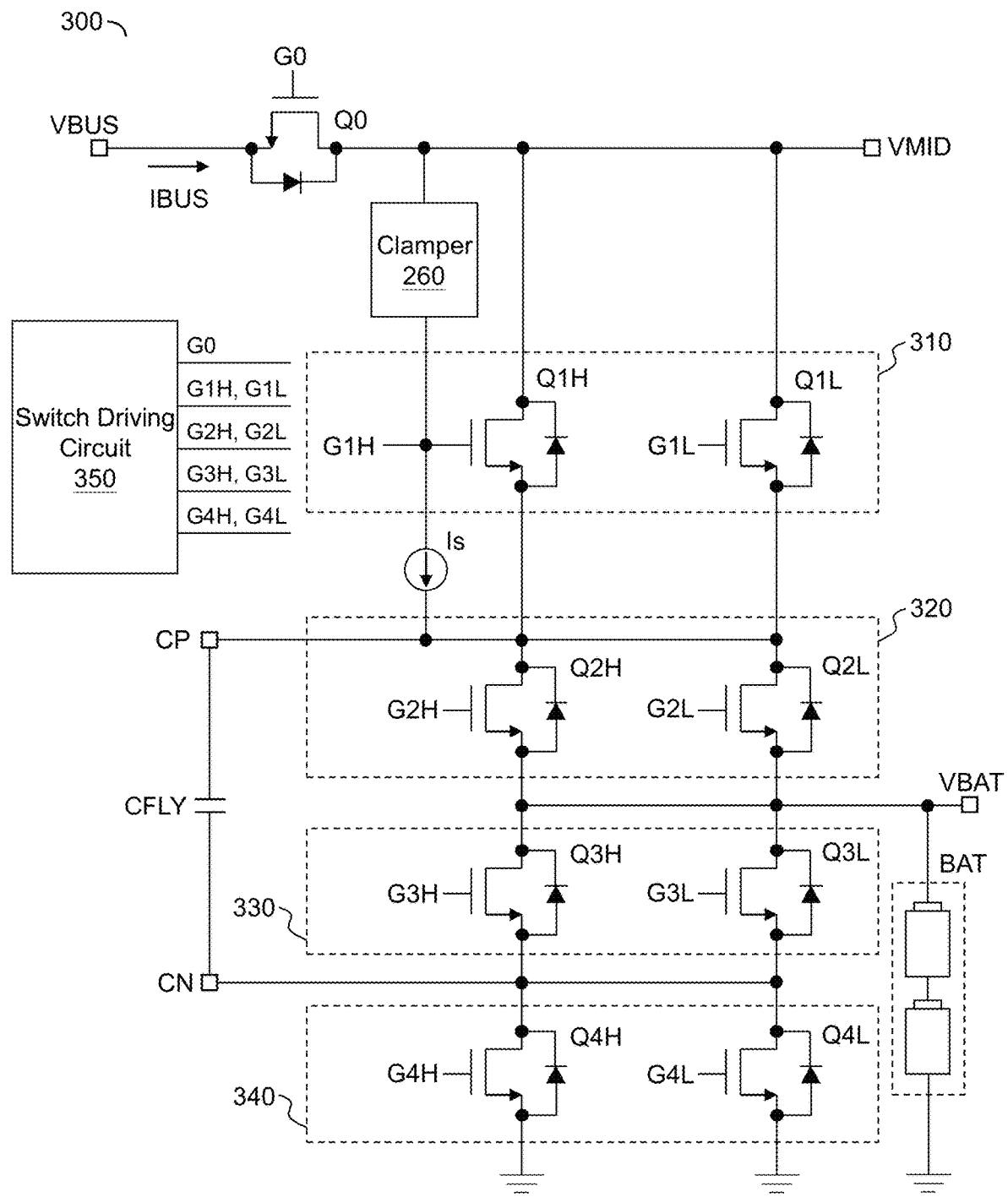
FIG. 11 is a schematic diagram of a switched capacitor converter having a clamper according to an embodiment of the present invention.

Referring to FIG. 11, which is a schematic diagram of a switched capacitor converter 300 with a clamper 260 according to an embodiment of the present invention. As shown in FIG. 11, the switched capacitor converter 300 further includes a clamper 260, wherein the clamper 260 is coupled between the first inverting output end of the first switch Q1L and the first control end of the first switch of Q1L in the first switch unit 310. It should be noted that, in other embodiments, the clamper 260 can be coupled to the first inverting output end of the first switch and the first control end of the first switch in other switch units (for example, the clamper 260 can be coupled between the first inverting output end of the first switch Q2H and the first control end of the first switch Q2H in the second switch unit 320). The position of the clamper 260 can be adjusted as desired or required.

In some embodiments, the clamper 260 is configured to clamp a voltage difference between the first inverting output end of the first switch Q1H and the first control end of the first switch Q1H in the first switch unit 310 to be below a clamping limit, so that a voltage difference between the first inverting output end of the first switch Q1H and the first non-inverting output end of the first switch Q1H does not exceed an absolute maximum rating of the first switch Q1H, and the clamping limit is less than the absolute maximum rating of the first switch Q1H. In other words, since the clamper 260 limits the voltage of the first switch Q1H during operation, the size of the first switch Q1H in the first switch unit 310 can be reduced, thereby reducing the conduction resistance of the first switch Q1H. Therefore, the clamping circuit technology can effectively reduce the overall loss of the switched capacitor converter 300.

Figure 12:
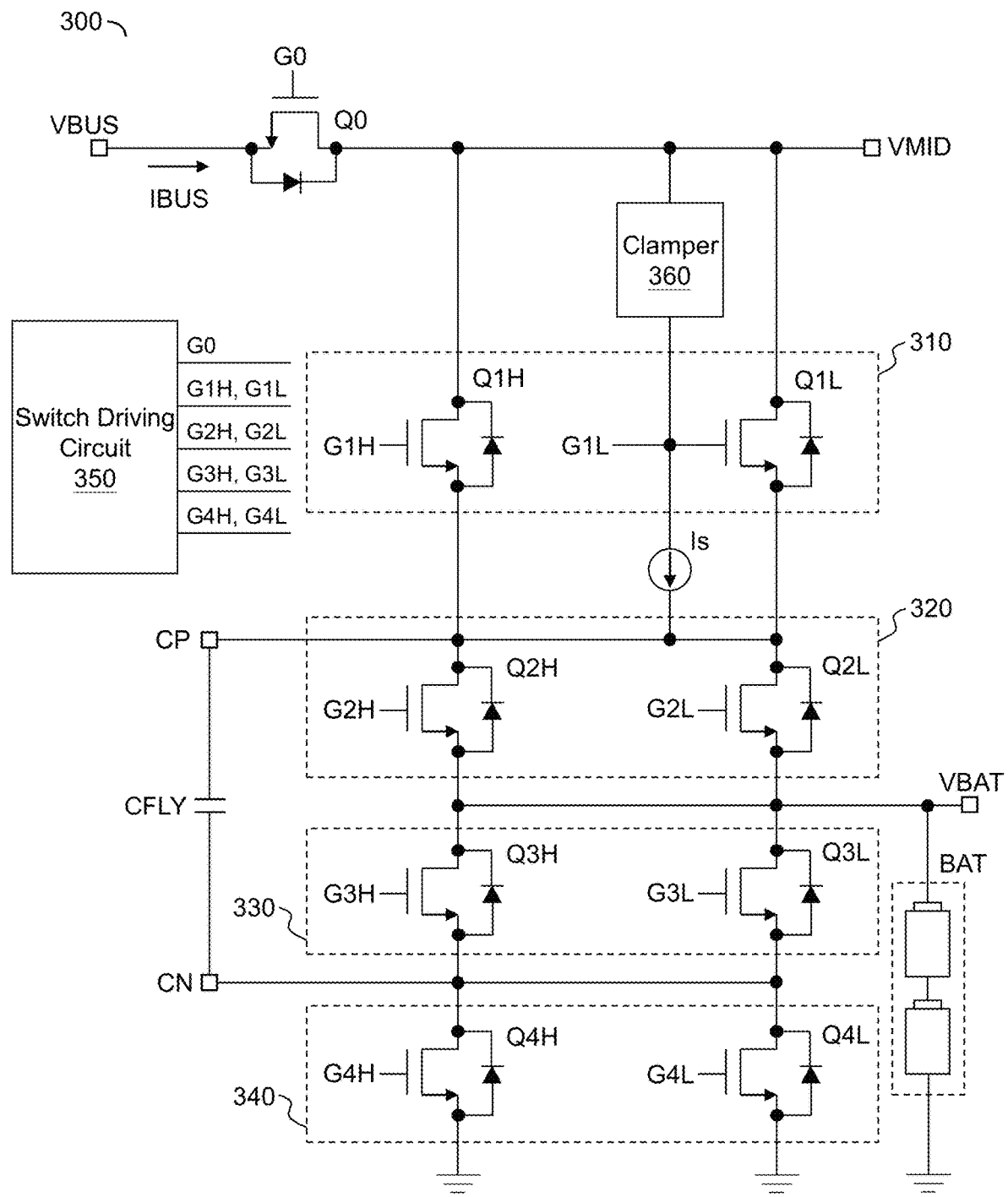
FIG. 12 is a schematic diagram of a switched capacitor converter having a clamper according to another embodiment of the present invention.

Please refer to FIG. 12, which is a schematic diagram of a switched capacitor converter 300 having a clamper 360 according to another embodiment of the present invention. As shown in FIG. 12, the switched capacitor converter 300 further includes a clamper 360, wherein the clamper 360 is coupled to the second inverting output end of the second switch Q1L and the second control end of the second switch Q1L in the first switch unit 310. In some embodiments, the switch circuit 200 further includes a current source Is, wherein the current source Is is configured to bias the clamper. Similarly, in other embodiments, the clamper 360 can be coupled to the second inverting output end of the second switch and the second control end of the second switch in other switch units (for example, the clamper 360 can be coupled to the second inverting output end of the second switch Q2L and the second control end of the second switch Q2L in the second switch unit 320). The position of the clamper 360 can be adjusted as desired or required.

In some embodiments, the clamper 360 is configured to clamp a voltage difference between the first inverting output end of the second switch Q1L and the first control end of the second switch Q1L in the first switch unit 310 to be below a clamping limit, so that a voltage difference between the first inverting output end of the second switch Q1L and the first non-inverting output end of the second switch Q1L does not exceed an absolute maximum rating of the second switch Q1L, and the clamping limit is less than the absolute maximum rating of the second switch Q1L. In other words, since the clamper 360 limits the voltage of the second switch Q1L during operation, the size of the second switch Q1L in the first switch unit 310 can be reduced, thereby reducing the conduction resistance of the second switch Q1L. Therefore, the clamping circuit technology can effectively reduce the overall loss of the switched capacitor converter 300.

Figure 13:
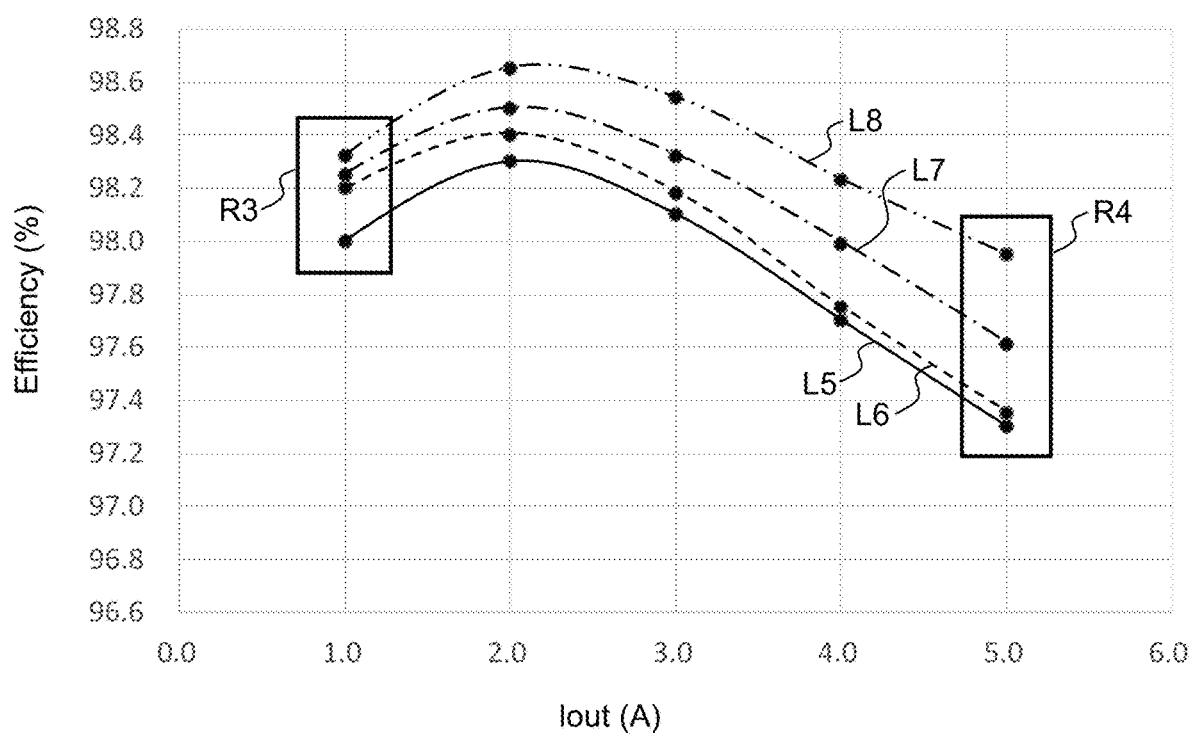
FIG. 13 is an efficiency diagram showing efficiency corresponding to output current in a switched capacitor converter according to some embodiments of the present invention.

Referring to FIG. 13, FIG. 13 is an efficiency diagram showing efficiency corresponding to output current in a switched capacitor converter according to some embodiments of the present invention, wherein a solid line L5 indicates an efficiency curve of the switched capacitor converter 100 of the conventional art, a dashed line L6 indicates the efficiency curve of the switched capacitor converter 300 using only split switches technology, a one-dot chain line L7 indicates the efficiency curve of the switched capacitor converter 300 using both split switches technology and non-rectangle SOA technology, and a two-dot chain line L8 indicates the efficiency curve of the switched capacitor converter 300 using the split switches technology, the non-rectangle SOA technology, and the clamping circuit technology at the same time. In the efficiency diagram of FIG. 13, the horizontal axis represents the output current Iout of the switched capacitor converter 300, in unit of ampere; the vertical axis represents the power conversion efficiency of the switched capacitor converter 300, in unit of percentage (%). As indicated by the frame R3 in FIG. 13, since the split switches technology reduces the switching loss, the charging efficiency of the switched capacitor converter 300 under light load can be effectively improved (the light load output current Iout is for example one ampere, in the present embodiment). As indicated by the frame R4 in FIG. 13, since the non-rectangle SOA technology and the clamping circuit technology reduce the conduction loss, the charging efficiency of the switched capacitor converter 300 under heavy load can be effectively improved (the heavy load output current Iout is for example 5 ampere, in the present embodiment). When the switched capacitor converter 300 adopts the split switches technology, the non-rectangle SOA technology, and the clamping circuit technology simultaneously (as indicated by the two-dot chain line L8), the charging efficiency of the switched capacitor converter 300 under any load is improved. In addition, in some embodiments, since the non-rectangle SOA technology or the clamping circuit technology reduces the conduction loss, the temperature of the switched capacitor converter 300 when operating under a heavy load also can be effectively reduced.

To sum up, when the switch circuit 200 and/or the switched capacitor converter 300 of the embodiments of the present invention are applied to various types of chargers, the charging efficiency of the charger under different loads can be effectively improved, and furthermore the temperature of the charger during fast charging can be effectively lowered, so as to prevent damage caused by overheating.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switch circuit, comprising:
 a first switch, including a first control end, a first inverting output end, and a first non-inverting output end;
 a second switch, including a second control end, a second inverting output end, and a second non-inverting output end, wherein the second inverting output end is coupled to the first inverting output end, and the second non-inverting output end is coupled to the first non-inverting output end, and wherein a conduction resistance of the first switch is greater than a conduction resistance of the second switch, and a parasitic capacitance of the first control end is less than a parasitic capacitance of the second control end; and
 a switch driving circuit, configured to generate a first control signal and a second control signal to control the first switch and the second switch, respectively;
 wherein the switch driving circuit controls the first switch to be turned on before the second switch is turned on and/or controls the first switch to be turned off later than a time point at which the second switch is turned off, so that when the second switch is turned on and/or turned off, a voltage difference between the second inverting output end and the second non-inverting output end is less than a predetermined voltage difference target value, so that a switching loss of the switch circuit is less than a predetermined target value;

wherein an open-circuit withstand voltage of the second switch is less than an open-circuit withstand voltage of the first switch.

2. The switch circuit of claim 1, wherein a layout area of the first switch is less than a layout area of the second switch.

3. The switch circuit of claim 2, wherein a ratio of the layout area of the first switch to the layout area of the second switch ranges from 1/5 to 1/3.

4. The switch circuit of claim 1, wherein the second switch is a metal-oxide-semiconductor field-effect transistor (MOSFET); the second control end is a gate; the second inverting output end is a drain; and the second non-inverting output end is a source.

5. The switch circuit of claim 1, wherein a coverage scope of a safe operating area (SOA) of the second switch is less than a coverage scope of the SOA of the first switch.

6. The switch circuit of claim 5, wherein a sheet resistance of the second switch is less than a sheet resistance of the first switch.

7. The switch circuit of claim 6, wherein an area ratio of the body contact of the second switch is less than an area ratio of the body contact of the first switch, so that the sheet resistance of the second switch is less than the sheet resistance of the first switch.

8. The switch circuit of claim 5, wherein the SOA of the first switch is non-rectangle.

9. The switch circuit of claim 5, wherein the SOA of the second switch is non-rectangle.

10. The switch circuit of claim 9, wherein the SOA of the second switch includes an inflection point, and a turning point withstand voltage corresponding to the inflection point is less than the open-circuit withstand voltage of the second switch.

11. The switch circuit of claim 10, wherein the turning point withstand voltage corresponding to the inflection point is 1/10 to 1/5 times the open-circuit withstand voltage of the second switch.

12. The switch circuit of claim 10, wherein a voltage of the second control end corresponding to the inflection point is greater than a turn-on threshold voltage of the second switch.

13. The switch circuit of claim 10, wherein the SOA of the first switch includes an inflection point, and a voltage of the second control end corresponding to the inflection point of the SOA of the second switch is less than a voltage of the first control end corresponding to the inflection point of the SOA of the first switch.

14. The switch circuit of claim 1, further comprising a clamper coupled between the first inverting output end and the first control end, wherein the clamper is configured to clamp a voltage difference between the first inverting output end and the first control end to be below a clamping limit, so that a voltage difference between the first inverting output end and the first non-inverting output end does not exceed an absolute maximum rating of the first switch, and the clamping limit is less than the absolute maximum rating of the first switch.

15. The switch circuit of claim 14, further comprising a current source coupled between the first control end and the first non-inverting output end and configured to bias the clamper.

16. The switch circuit of claim 1, further comprising a clamper coupled between the second inverting output end and the second control end, wherein the clamper is configured to clamp a voltage difference between the second inverting output end and the second control end to be below a clamping limit, so that a voltage difference between the second inverting output end and the second non-inverting output end does not exceed an absolute maximum rating of the second switch, and the clamping limit is less than the absolute maximum rating of the second switch.

17. The switch circuit of claim 16, further comprising a current source coupled between the second control end and the second non-inverting output end and configured to bias the clamper.

18. A switched capacitor converter, comprising:
a plurality of switch units, configured to switch a coupling relationship of a capacitor with a first power and a second power, thereby converting the first power into the second power, or converting the second power into the first power, wherein a voltage of the first power is greater than a voltage of the second power;
wherein at least one of the switch units includes a switch circuit, the switch circuit including:
a first switch, including a first control end, a first inverting output end, and a first non-inverting output end;
a second switch, including a second control end, a second inverting output end, and a second non-inverting output end, wherein the second inverting output end is coupled to the first inverting output end, and the second non-inverting output end is coupled to the first non-inverting output end, and wherein a conduction resistance of the first switch is greater than a conduction resistance of the second switch, and a parasitic capacitance of the first control end is less than a parasitic capacitance of the second control end; and
a switch driving circuit, configured to generate a first control signal and a second control signal to control the first switch and the second switch, respectively;
wherein the switch driving circuit controls the first switch to be turned on before the second switch is turned on and/or controls the first switch to be turned off later than a time point at which the second switch is turned off, so that when the second switch is turned on and/or turned off, a voltage difference between the second inverting output end and the second non-inverting output end is less than a predetermined voltage difference target value, so that a switching loss of the switch circuit is less than a predetermined target value.

19. The switched capacitor converter of claim 18, wherein the switch units includes a first switch unit, a second switch unit, a third switch unit, and a fourth switch unit, wherein at least one of the first switch unit, the second switch unit, the third switch unit, and the fourth switch unit includes the switch circuit; the first switch unit being coupled between a first power and a first end of a capacitor, the second switch unit being coupled between the first end of the capacitor and a second power, the third switch unit being coupled between the second power and the second end of the capacitor, the fourth switch unit being coupled between the second end of the capacitor and a ground potential; wherein the first switch unit, the second switch unit, the third switch unit, and the fourth switch unit are configured to periodically switch the first end of the capacitor between the first power and the second power, and the second end of the capacitor is correspondingly switched between the second power and the ground potential, so that the first power is converted into the second power, or the second power is converted into the first power, wherein the voltage of the first power is twice the voltage of the second power, and a current of the first power is ½ times a current of the second power.

20. The switched capacitor converter of claim 19, wherein an open-circuit withstand voltage of the second switch is less than an open-circuit withstand voltage of the first switch.

21. The switched capacitor converter of claim 20, wherein a SOA of the second switch is less than a SOA of the first switch.

22. The switched capacitance converter of claim 21, wherein a sheet resistance of the second switch is less than a sheet resistance of the first switch.

23. The switched capacitor converter of claim 22, wherein an area ratio of the body contact of the second switch is less than an area ratio of the body contact of the first switch, so that the sheet resistance of the second switch is less than the sheet resistance of the first switch.

24. The switched capacitor converter of claim 21, wherein the SOA of the first switch is non-rectangle.

25. The switched capacitor converter of claim 21, wherein the SOA of the second switch is non-rectangle.

26. The switched capacitor converter of claim 25, wherein the SOA of the second switch includes an inflection point, and a turning point withstand voltage corresponding to the inflection point is less than the open-circuit withstand voltage of the second switch.

27. The switched capacitor converter as claimed in claim 26, wherein the turning point withstand voltage corresponding to the inflection point is 1/10 to 1/5 times the open-circuit withstand voltage of the second switch.

28. The switched capacitor converter of claim 26, wherein a voltage of the second control end corresponding to the inflection point is greater than a turn-on threshold voltage of the second switch.

29. A switch, configured to switch a coupling relationship of a capacitor with a first power and a second power, thereby converting the first power into the second power, or converting the second power into the first power, wherein a voltage of the first power is greater than a voltage of the second power; the switch comprising a control end, an inverting output end, and a non-inverting output end, wherein the switch has a non-rectangle SOA, and wherein a control voltage exists between the control end and the non-inverting output end, and a cross voltage exists between the inverting output end and the non-inverting output end, wherein when the switch switches the capacitor to perform power conversion, an operation locus corresponding to a relationship between the control voltage and the cross voltage is limited in the non-rectangle SOA.

* * * * *